Figure 8:
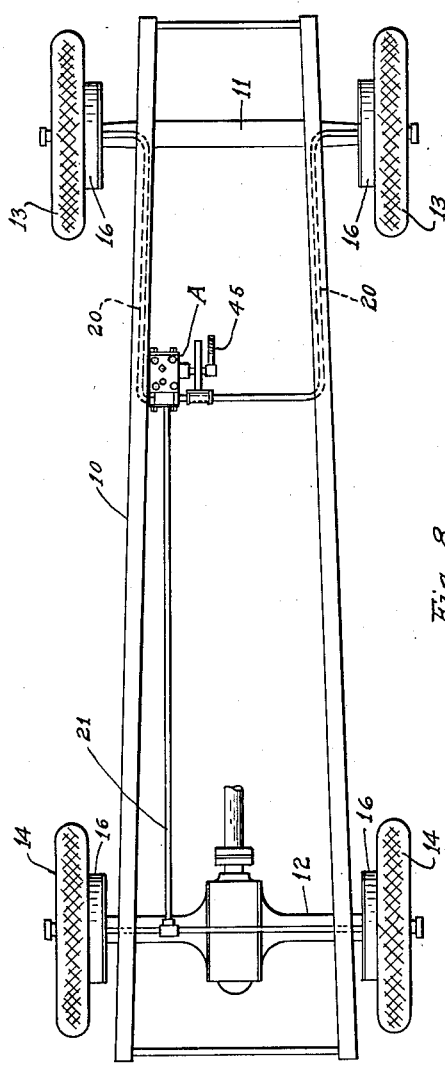

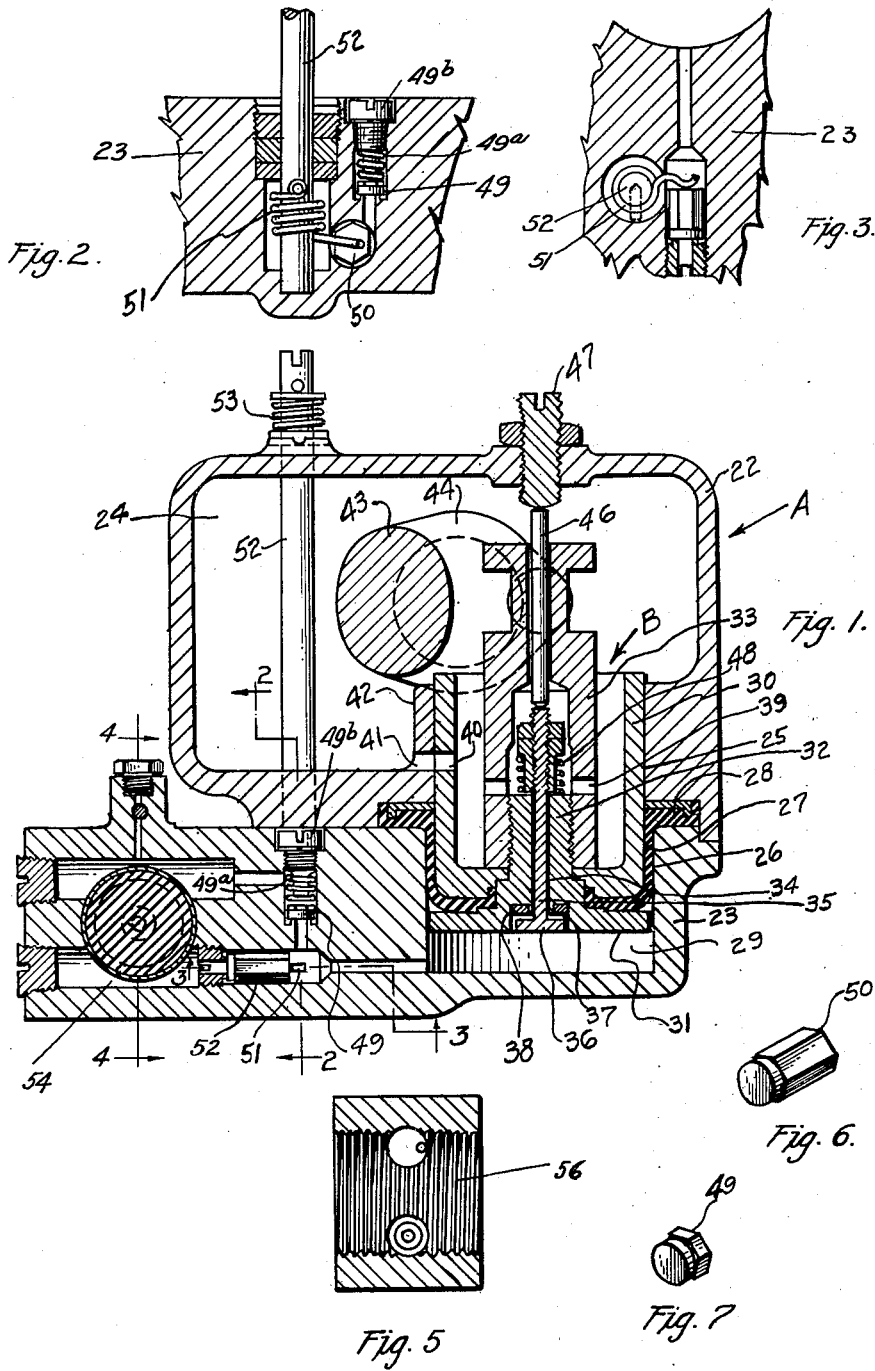

June 22, 1937.  J. W. TATTER  2,084,416
BRAKE
Original Filed April 3, 1930    2 Sheets-Sheet 2

INVENTOR.
JOHN W. TATTER
BY W. W. Harris
ATTORNEY.

Patented June 22, 1937

2,084,416

UNITED STATES PATENT OFFICE 2,084,416

BRAKE

John W. Tatter, Akron, Ohio, assignor to Bendix Products Corporation, South Bend, Ind., a corporation of Indiana Refiled for abandoned application Serial No. 441,189, April 3, 1930. This application June 19, 1936, Serial No. 86,065

17 Claims. (Cl. 60—54.6)

This is a refile of my abandoned application Serial No. 441,189, filed April 3, 1930.

My invention relates to brakes and more particularly to a master cylinder structure adapted for use with a fluid brake system for vehicles and the like.

Difficulty has been experienced in maintaining the proper clearance between the brake drum and the brake shoe or shoes of a fluid pressure actuated brake system due to the tendency toward variations in volume resulting from temperature variations and also due to wear of the friction braking elements. Frequent adjustments are found necessary, and in many cases such adjustments are not made as often as required resulting in a loss of braking efficiency.

It is the object of my invention to overcome the aforesaid difficulties and to maintain the braking efficiency of a fluid pressure actuated braking system at a maximum at all times by providing means for maintaining substantially the same clearance between the friction elements irrespective of temperature variations to which the brake fluid is subjected.

Another object of my invention is to maintain approximately a constant clearance between the friction elements of a fluid pressure actuated braking system by maintaining a constant initial fluid pressure in the brake system.

A further object of my invention is to facilitate the maintenance of a constant initial fluid pressure in the brake system by providing an adjustable valve that automatically maintains a predetermined initial fluid pressure in the system irrespective of temperature variations effecting the fluid contained in the said brake system.

A still further object of my invention is to provide a more efficient and reliable fluid pressure generating device for use with a fluid brake system by providing valve means for opening or closing a communicating passage between the reservoir and fluid chamber in advance of the piston, said valve means being actuated to open the passage while the piston is at rest or in an inoperative position to insure an adequate supply of brake fluid at all times for use in the brake system.

A still further object of my invention is to facilitate the installation and maintenance of a hydraulic brake system by providing easily actuated means permitting the escape of air from the system on filling the same with the brake fluid.

Figure 4:
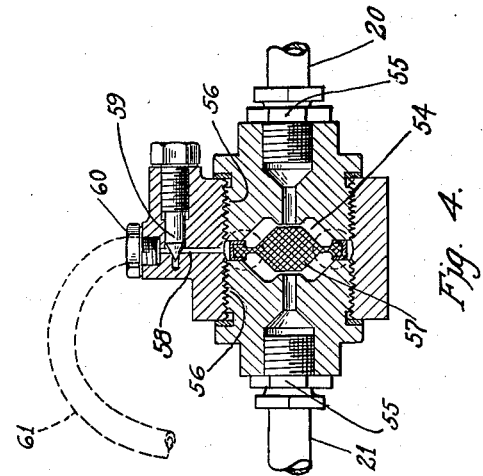

For a more detailed understanding of my invention reference may be had to the accompanying drawings which illustrate one form which my invention may assume, and in which:

Figure 1 is a vertical sectional view of a master cylinder for a fluid brake system constructed in accordance with my invention, Figs. 2, 3, and 4 are detail sectional views taken respectively on the lines 2—2, 3—3, and 4—4 of Fig. 1, Fig. 5 is a detail sectional view taken substantially on the line 4—4 but showing the pipe fittings to which the fluid conduits are connected removed, Fig. 6 is a detail perspective view of the valve for controlling the return flow of the fluid.

Figure 9:
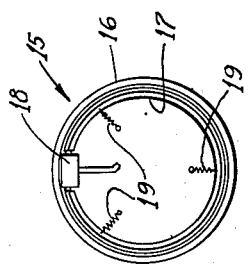

Fig. 7 is a detail perspective view of the check valve interposed intermediate the fluid chamber and the fluid brake system, Fig. 8 is a diagrammatic plan view of a vehicle showing a fluid brake system assembled therewith, and Fig. 9 is a detail view of the braking mechanism.

My improved master cylinder structure and fluid control mechanism is adapted to be associated with a vehicle such as an automobile or the like. The chassis frame of the vehicle is designated by the reference character 10 and supports the front and rear axles 11 and 12 respectively, with which are respectively assembled the front and rear wheels 13 and 14. Fluid pressure actuated brake mechanisms 15 are assembled to all four wheels and each comprises a brake drum 16 secured to the wheel, an expanding brake shoe 17 being assembled with each brake band. The brake shoe is expanded by a fluid pressure actuated device 18, the tension springs 19 serving to return the shoe to an inoperative position. The devices 18 associated with the front wheels are operatively connected with a fluid conduit 20, while the devices 18 associated with the rear wheels are operatively connected with a fluid conduit 21.

A master cylinder A comprising upper and lower castings 22 and 23 respectively secured together is associated with this fluid system and is so actuated as to increase the fluid pressure in the system for expanding the brake shoes to set the brakes. A reservoir 24 is constructed in the upper master cylinder casting and is provided with an opening 25 adapted for registration with an opening 26 in the lower casting 23. An expansible cup-shaped member 27 is assembled with the master cylinder structure A, said cup being preferably constructed of rubber and provided with a circumferential flange 28 about the rim which is adapted to be clamped between the upper and lower castings.

The lower casting 23 is provided with a cylindrical chamber or cylinder 29 in which a piston structure B is arranged to operate. The piston comprises a cup 30 and a piston head 31 provided with an externally threaded stem 32. A clamping member or stud 33 is threaded onto the externally threaded stem 32, the bottom wall of the rubber cups 27 being clamped between the two piston parts, to wit: the cup 30 and the head 31. The stem 32 is provided with a hole 34 extending longitudinally therethrough, which is adapted to receive the stem 35 of a valve 36. The bottom face of the piston head is recessed as at 37, the bottom of the recess provided preferably with a rubber washer 38 forming a seat for the valve. The hole or bore is larger in diameter than the valve stem 35 so that when the valve is unseated the fluid chamber 29 is in open communication with the reservoir 24, the stud 33 provided with a hole 39 opening into the interior of the cup 30 and the interior of the cup 30 is in open communication with the reservoir 24. Preferably a hole 40 is constructed in the wall of the cup which is adapted to register with a hole 41 formed in the guide wall 42 carried by the upper casting 22 when the piston is at rest, the hole 41 communicating with interior of the reservoir adjacent the bottom. The rocker arm 43 having the yoke arms 44 is rotatably supported by the upper casting 22, the yoke arms being arranged to engage the stud 33 secured to the piston so that when the operator steps on the brake pedal 45 the piston is depressed, the rock arm and piston being returned to an inoperative position when the pressure on the brake pedal is released. The valve 36 is arranged to be unseated when the piston is in an inoperative position and this is accomplished by providing a pin 46 that is slidably supported by the stud and which is adapted to engage an adjustable stop 47 and the end of the valve stem 35. As shown in Fig. 1 the valve is unseated establishing a communication between the fluid chamber 29 and the reservoir 24 thereby permitting fluid to flow from the reservoir to the chamber to replenish the supply of fluid in the system. The fluid supply in the system is thus maintained up to a maximum at all times. As soon as the piston is moved the valve stem and pin are disengaged from the stop 47 and the valve 36 is seated under the influence of the spring 48 which acts upon the valve stem.

As the fluid pressure in the chamber 29 is increased, the check valve 49 is opened against the action of a light spring 49ᵃ which abuts the adjustable screw 49ᵇ permitting this pressure to be transmitted to the fluid in the brake system, the increased fluid pressure in the system actuating the brake mechanism to engage the brake shoes with the brake drums. When the brake pedal 45 is released, the piston is moved back to a position of rest corresponding to that shown in Fig. 1, the pressure of the fluid in the system closing the check valve 49 and opening the return valve 50. The opening of the return valve 50 is resisted by a manually adjusted spring 51, this spring being secured or attached to a shaft 52 which may be in this instance turned to wind or unwind the spring 51 to produce more or less resistance to the opening of the valve 50. Any suitable locking means 53 may be employed to set the shaft 52 in any adjusted position. The purpose of the valve 50 and the adjustable means for resisting the opening of the valve is to maintain a predetermined initial fluid pressure in the brake system for maintaining the proper clearance between the brake shoes and the brake drums associated therewith. As the shoes and drums wear the clearance is increased, but by increasing the resistance acting on the valve 50 to seat the same, a greater initial fluid pressure may be maintained in the system to take up the excess clearance. Furthermore since all brake fluids will expand or contract when subjected to temperature variations, the volume of the fluid in the system tends to be respectively increased or decreased. Consequently when no compensating devices are used, the clearance between the braking elements is varied. But with the use of a valve as shown in my structure, a predetermined initial fluid pressure is automatically maintained in the brake system, and thus a proper clearance between the brake elements is maintained irrespective of temperature variations that effect the fluid.

The lower master cylinder casting 23 is provided with a second fluid chamber 54, the valves 49 and 50 interposed between the chamber 29 and this second chamber 54. The fluid conduits 20 and 21 are open to the chamber 54, the conduits being secured to the unions 55 that are threaded into the internally threaded openings 56 in the casting. A flexible diaphragm or valve 57, as described and claimed in my copending application Serial No. 402,845 filed October 28, 1929, may be employed to shut off either of the conduits 20 or 21 when a break occurs in one of them. An air vent 58 is provided for permitting the escape of air or other foreign fluids from the system, said vent having a valve 59 which is arranged to block the air vent. A plug 60 normally closes the air vent, but when withdrawing foreign fluids from the system the plug is removed and a pipe 61 is secured to the enlarged internally threaded hole. When the air or other fluid has escaped the valve may be closed and the pipe removed, after which the plug 60 may be replaced.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a fluid brake system including a brake mechanism and a main pressure conduit, the combination of means for applying pressure to and causing the fluid in the brake system to actuate the brake mechanism, resiliently actuated valve means for maintaining an initial fluid pressure in the brake system to maintain the brake mechanism in approximately the same clearance position at all times, said valve means being located in the main pressure conduit of the brake system, and means for adjusting said resiliently actuated valve means to vary the initial fluid pressure.

2. In a fluid brake system provided with brake mechanism, the combination of means for developing hydraulic pressure to operate the brake mechanism, said means being further provided with a fluid reservoir enclosing portions of its pressure developing means, valve means for controlling the return flow of the fluid from the system to said fluid reservoir, a member opposing the opening movement of said valve means, and manually operable means operatively connected with said last mentioned member to permit selective maintenance of any desired initial fluid pressure in said brake system, within the limits of said manually operable means, to maintain approximately a predetermined operating clearance in the brake mechanism.

3. In a fluid brake system, the combination of means for applying pressure to the fluid in the brake system, said means being provided with a bore together with a piston operating in the bore, said means being further provided with a passage leading from the bore in which the piston operates, valve means for controlling the return flow of the fluid from the system through the passage leading from the bore in which the piston operates, an adjusting member, means yieldingly resisting the opening of said valve means to maintain an initial fluid pressure in the brake system, said last mentioned means being suitably anchored to said adjusting member, and means for locking said adjustable member in its adjusted position.

4. In a fluid brake system, the combination of means for applying pressure to the fluid in the brake system, said means comprising a fluid chamber, valve means for controlling the return flow of the fluid from the system to said fluid chamber, resilient means resisting the opening of said valve means to maintain an initial fluid pressure in said brake system, and manually operable means for adjusting the resilient means to vary said initial pressure.

5. In a fluid brake system, the combination of means for applying pressure to the fluid in the brake system, said means comprising a fluid reservoir together with a fluid chamber, a piston operating in the fluid chamber of said means, means connecting the fluid chamber of said first mentioned means with the fluid brake system, a check valve permitting the fluid to freely flow from the fluid chamber of said first mentioned means to the brake system, means for actuating the piston, valve means for controlling the return flow of the fluid from the brake system to the fluid chamber of said first mentioned means, means yieldingly resisting the opening of said valve means, and manually operable means for adjusting said last mentioned means to maintain any desired initial fluid pressure in the brake system within the limits of said means yieldingly resisting the opening of said valve means.

6. In a fluid brake system, the combination of a friction member, a member adapted to be engaged by said friction member, means for applying pressure to the fluid in the brake system to cause said friction member to engage said second mentioned member, said means comprising a fluid reservoir, a fluid chamber, a piston operating in the fluid chamber, together with means placing the fluid chamber in communication with the reservoir when the piston is in an inoperative position, said last mentioned means extending through the piston, and a manually adjustable valve means intermediate the fluid chamber and the fluid brake system for selectively maintaining any desired initial fluid pressure within the limits of said valve means, for maintaining said friction member in approximately the same clearance position at all times relative to said second mentioned member.

7. A master cylinder for fluid brake systems comprising a casing structure having a reservoir portion, a cylinder having an end portion, a piston operable in said cylinder, said piston being disposed intermediate the end portion of said cylinder and the reservoir portion of said casing, conduit means in said piston connecting the reservoir portion of said casing with the end portion of said cylinder, valve means carried by said piston for controlling the flow of fluid through said conduit means, and means actuating said valve means to unseat the same while said piston is in an inoperative position.

8. A master cylinder for a fluid brake system comprising a casing structure having a reservoir portion, a cylinder having an end portion, a piston operable in said cylinder, said piston being disposed intermediate the end portion of said cylinder and the reservoir portion of said casing, conduit means in said piston, said conduit means connecting the reservoir of said casing with the end portion of said cylinder, a valve carried by said piston for controlling the flow of fluid through said conduit means, yielding means for seating said valve, said yielding means being carried by said piston, and means for unseating said valve while said piston is in an inoperative position.

9. A master cylinder for a fluid brake system comprising a casing structure having a reservoir portion, a cylinder having a piston clearance portion, a piston operable in said cylinder, said piston being disposed intermediate the reservoir portion of said casing structure and the piston clearance portion of said cylinder, conduit means connecting the reservoir portion of said casing structure with the piston clearance portion of said cylinder, said conduit means extending through said piston, valve means for controlling the flow of fluid through said conduit means, and means for unseating said valve means while the piston is in an inoperative position.

10. A master cylinder for a fluid brake system comprising a casing structure having a reservoir portion, a cylinder having a piston clearance portion, a piston operable in said cylinder, said piston being disposed intermediate the piston clearance portion of said piston and the reservoir portion of said casing structure, conduit means connecting the reservoir portion of said casing srtucture and the piston clearance portion of said cylinder, said conduit means extending through said piston, a valve controlling the flow of liquid through said conduit means, said valve being provided with a portion extending through said piston and projecting into the reservoir portion of said casing structure, and an adjustable member supported by said casing structure, said adjustable member being adapted to unseat said valve while said piston is in an inoperative position.

11. In a fluid brake system, the combination of a fluid chamber connected with the brake system, said fluid chamber being provided with a valve member suitably mounted therein, said fluid chamber being further provided with a vent passage connected therewith, an adjustable member suitably mounted to extend approximately at right angles to the longitudinal center of said vent passage, said adjustable member being provided with a valve seating portion for closing said vent passage, and a member for closing the end of said vent passage, said last mentioned member having an axis extending parallel with the longitudinal center of said vent passage.

12. In a fluid brake system, the combination of a fluid chamber connected with the brake system, said fluid chamber being provided with a vent passage leading therefrom, a second passage extending at an angle with and intersecting said vent passage, said second passage having a portion of varying cross sectional area at the intersection with said vent passage, an adjustable member suitably mounted in said second passage, said adjustable member having a portion of varying cross section for closely contacting said portion of varying cross section of said second passage at the intersection with said vent passage, and a member for closing the end of said vent passage.

13. In a fluid brake system, the combination of a casing having a cylinder, a piston operatively mounted in said cylinder to develop pressure to be transmitted to the fluid in the system, a fluid chamber formed between a pair of oppositely disposed union members suitably mounted in said casing and each provided with passages for connecting with the fluid brake system, a valve member for closing the passage of one of said union members, a vent passage connecting said fluid chamber with the atmosphere, a member for intersecting and closing said vent passage, and a member for closing the atmosphere end of said vent passage.

14. In a fluid brake system having a brake mechanism and means for applying pressure to the fluid in the system for actuating the brake mechanism to its engaged position, said means comprising a piston together with conduit means for conducting the fluid under pressure developed by said piston to said brake mechanism, means for maintaining an initial fluid pressure in the system, said means being manually adjustable to vary the initial pressure to compensate for wear in the brake mechanism, said means being located in said conduit means of said first mentioned means.

15. In a fluid brake system having a brake mechanism, the combination of means for applying pressure to the fluid in the brake system to actuate the brake mechanism to its engaged position, said means including a piston together with conduit means conducting the fluid under pressure developed by said piston to said brake mechanism, and means for maintaining an initial fluid pressure in the brake system, said last mentioned means being manually adjustable to vary the initial pressure to compensate for wear in the brake system, said last mentioned means being located in said conduit means of said first mentioned means.

16. In a fluid brake system, the combination of a casing structure having a reservoir portion together with a cylinder having a piston clearance portion, a piston intermediate the reservoir portion and the piston clearance portion of the cylinder of said casing structure, and valve means extending through said piston, said valve means providing communication between the reservoir portion and the piston clearance portion of said casing structure when said piston is in an inoperative position.

17. In a master cylinder for a fluid brake system, the combination of a casing structure provided with a cylinder, a piston operating in said cylinder, a valve chamber provided with a pair of outlets, valve means in said valve chamber between said pair of outlets, a fluid passage leading from said cylinder to said valve chamber, a second fluid passage connecting said valve chamber and said first mentioned fluid passage at a point removed from said cylinder, valve means permitting fluid to freely flow from said cylinder through one of said fluid passages to the brake system, and valve means for controlling the return flow of fluid through one of said passages to said cylinder.

JOHN W. TATTER.